(12) United States Patent
Tomita (10) Patent No.: US 9,732,650 B2
(45) Date of Patent: Aug. 15, 2017

(54) EXHAUST GAS PURIFICATION APPARATUS, AND METHOD FOR THAWING LIQUID REDUCING AGENT OR PRECURSOR THEREOF

(71) Applicant: UD TRUCKS CORPORATION, Ageo-shi (JP)

(72) Inventor: Yasuyoshi Tomita, Ageo (JP)

(73) Assignee: UD Trucks Corporation, Ageo-Shi (JP)

(*) Notice: Subject to any disclaimer, the term of this patent is extended or adjusted under 35 U.S.C. 154(b) by 49 days.

(21) Appl. No.: 14/602,171

(22) Filed: Jan. 21, 2015

(65) Prior Publication Data

US 2015/0128570 A1    May 14, 2015

Related U.S. Application Data

(63) Continuation of application No. PCT/JP2012/068723, filed on Jul. 24, 2012.

(51) Int. Cl.
  *F01N 3/20*      (2006.01)
  *F01N 5/02*      (2006.01)
  (Continued)

(52) U.S. Cl.
  CPC ........... *F01N 3/2006* (2013.01); *F01N 3/021* (2013.01); *F01N 3/035* (2013.01); *F01N 3/106* (2013.01);
  (Continued)

(58) Field of Classification Search
  CPC ...... F02D 41/029; F01N 9/002; F01N 3/0842; F01N 3/035; F01N 13/02
  (Continued)

(56) References Cited

U.S. PATENT DOCUMENTS

2006/0096281 A1*   5/2006  Huang ................... F01N 3/031
                                                              60/297
2007/0180816 A1*   8/2007  Masuda ............. B01D 53/9409
                                                              60/274
(Continued)

FOREIGN PATENT DOCUMENTS

CN          1257435 A      6/2000
CN          1853035 A     10/2006
            (Continued)

OTHER PUBLICATIONS

Machine Translation of JP 2010019134, Translated on May 4, 2016.*

(Continued)

*Primary Examiner* — Patrick Maines
(74) *Attorney, Agent, or Firm* — McDermott Will & Emery LLP (57) ABSTRACT

An exhaust gas purification apparatus includes: a reduction catalyst converter that reduces and purifies nitrogen oxides in exhaust gas; a tank that stores a liquid reducing agent or precursor thereof; and an injection nozzle that injects the liquid reducing agent or precursor thereof stored in the tank on an exhaust gas upstream side of the reduction catalyst converter. Some of the exhaust gas flowing through an exhaust pipe is diverted to the tank by a bypass pipe, to cause an exchange of heat between the diverted exhaust gas and the liquid reducing agent or precursor thereof stored in the tank, thereby thawing the liquid reducing agent or precursor thereof frozen in the tank.

11 Claims, 7 Drawing Sheets

(51) Int. Cl.
*F01N 3/021* (2006.01)
*F01N 3/035* (2006.01)
*F01N 3/10* (2006.01)

(52) U.S. Cl.
CPC ........... *F01N 3/208* (2013.01); *F01N 3/2066* (2013.01); *F01N 5/02* (2013.01); *F01N 2240/02* (2013.01); *F01N 2270/02* (2013.01); *F01N 2410/00* (2013.01); *F01N 2410/06* (2013.01); *F01N 2610/01* (2013.01); *F01N 2610/02* (2013.01); *F01N 2610/10* (2013.01); *F01N 2610/105* (2013.01); *F01N 2610/1406* (2013.01); *F01N 2610/1433* (2013.01); *F01N 2610/1473* (2013.01); *F01N 2610/1486* (2013.01); *F01N 2900/0416* (2013.01); *F01N 2900/08* (2013.01); *F01N 2900/12* (2013.01); *F01N 2900/1404* (2013.01); *F01N 2900/1811* (2013.01); *Y02T 10/16* (2013.01); *Y02T 10/24* (2013.01)

(58) Field of Classification Search
USPC .................................. 60/295, 288, 287, 320
See application file for complete search history.

(56) References Cited

U.S. PATENT DOCUMENTS

| | | | | |
|---|---|---|---|---|
| 2009/0293836 | A1* | 12/2009 | Schindler | B01D 46/4281 123/198 E |
| 2011/0011060 | A1* | 1/2011 | McCarthy, Jr. | F01N 3/0814 60/274 |
| 2013/0074479 | A1* | 3/2013 | Ryoo | F01N 3/2066 60/287 |

FOREIGN PATENT DOCUMENTS

| | | | | | |
|---|---|---|---|---|---|
| DE | EP 1602805 | A1 | * | 12/2005 | ........... F01N 3/2066 |
| EP | 1602805 | A1 | | 12/2005 | |
| EP | 2273082 | A1 | | 1/2011 | |
| IT | EP 2944779 | A1 | * | 11/2015 | ........... F01N 3/2066 |
| JP | 2006132496 | A | * | 5/2006 | |
| JP | 4238598 | B2 | * | 3/2009 | |
| JP | 2010-019134 | A | | 1/2010 | |
| JP | 2010019134 | A | * | 1/2010 | |
| JP | 2010-138883 | A | | 6/2010 | |
| JP | 2010127147 | A | * | 6/2010 | |
| JP | 2010138883 | A | * | 6/2010 | |
| JP | 2012-013060 | A | | 1/2012 | |
| JP | 2012052476 | A | * | 3/2012 | |
| JP | 2013245652 | A | * | 12/2013 | |
| JP | WO 2014203350 | A1 | * | 12/2014 | ............. F01N 3/103 |
| KR | 20070059641 | A | * | 6/2007 | ............... F01N 5/02 |

OTHER PUBLICATIONS

Machine Translation of JP2010127147, Translated on May 4, 2016.*

Japanese Office Action dated Oct. 13, 2015, which issued in Japanese Patent Application No. 2014-526645, together with an English language translation thereof.

Extended European Search Report dated Feb. 12, 2016, which issued in European Application No. 12881718.6.

Chinese Office Action datd May 3, 2016, which issued in Chinese Patent Application No. 201280074323.4, together with an English language translation thereof.

* cited by examiner

EXHAUST GAS PURIFICATION APPARATUS, AND METHOD FOR THAWING LIQUID REDUCING AGENT OR PRECURSOR THEREOF

CROSS-REFERENCE TO RELATED APPLICATION

This application is a continuation application of PCT/JP2012/068723, filed on Jul. 24, 2012, which is hereby incorporated by reference in its entirety for all purposes.

BACKGROUND OF THE INVENTION

1. Field of the Invention

The present invention relates to an exhaust gas purification apparatus that selectively reduces and purifies nitrogen oxide (NOx) in exhaust gas, and relates to a method for thawing a liquid reducing agent or precursor thereof used in the exhaust gas purification apparatus.

2. Description of Related Art

As an exhaust gas purifying system that purifies NOx contained in exhaust gas from an engine, an exhaust gas purification apparatus as disclosed in Japanese Patent Application Laid-open Publication No. 2012-13060 has been proposed. In this exhaust gas purification apparatus, a urea aqueous solution is injected, in accordance with an engine operation state, on an exhaust gas upstream side of a selective catalytic reduction (SCR) converter disposed in an exhaust pipe of the engine, and, using ammonia produced by hydrolysis, NOx is selectively subjected to a reduction reaction by the SCR converter and thus purified into harmless components.

In a cold area or the like, the temperature of outside air in winter decreases to or below the freezing point of a urea aqueous solution, and a urea aqueous solution stored in a tank gradually freezes, with the result that the urea aqueous solution cannot be injected on an exhaust gas upstream side of the SCR converter. For this reason, a conventional technique proposed in Patent Document 1 employs a configuration in which the urea aqueous solution frozen in the tank is thawed using engine coolant.

However, for example, right after cold start or the like, the temperature of engine coolant is low. In particular, in a small-displacement engine that generates less heat, increase in the temperature of the engine coolant is gradual, making it difficult to thaw the urea aqueous solution in the tank in a short time.

SUMMARY OF THE INVENTION

Accordingly, it is an object of the present invention to provide a technique that is able to thaw a liquid reducing agent or precursor thereof even right after cold start or the like.

An exhaust gas purification apparatus includes: a reduction catalyst converter that reduces and purifies NOx in exhaust gas; a tank that stores a liquid reducing agent or precursor thereof; an injection nozzle that injects the liquid reducing agent or precursor thereof stored in the tank on an exhaust gas upstream side of the reduction catalyst converter; and a bypass pipe that allows some of the exhaust gas flowing through an exhaust pipe to be diverted to the tank, to cause an exchange of heat between the diverted exhaust gas and the liquid reducing agent or precursor thereof stored in the tank. A method for thawing a liquid reducing agent or precursor thereof, including the step of heating a tank storing a liquid reducing agent or precursor thereof to be injected on an exhaust gas upstream side of a reduction catalyst converter that reduces and purifies NOx in exhaust gas, with some of the exhaust gas flowing through an exhaust pipe, so that the reducing agent or precursor thereof frozen in the tank is thawed.

According to the present proposed technique, a liquid reducing agent or precursor thereof can be thawed in a short time even right after cold start or the like.

DESCRIPTION OF PREFERRED EMBODIMENTS

Hereinbelow, embodiments for carrying out the invention will be described in detail with reference to the accompanying drawings.

Figure 1:
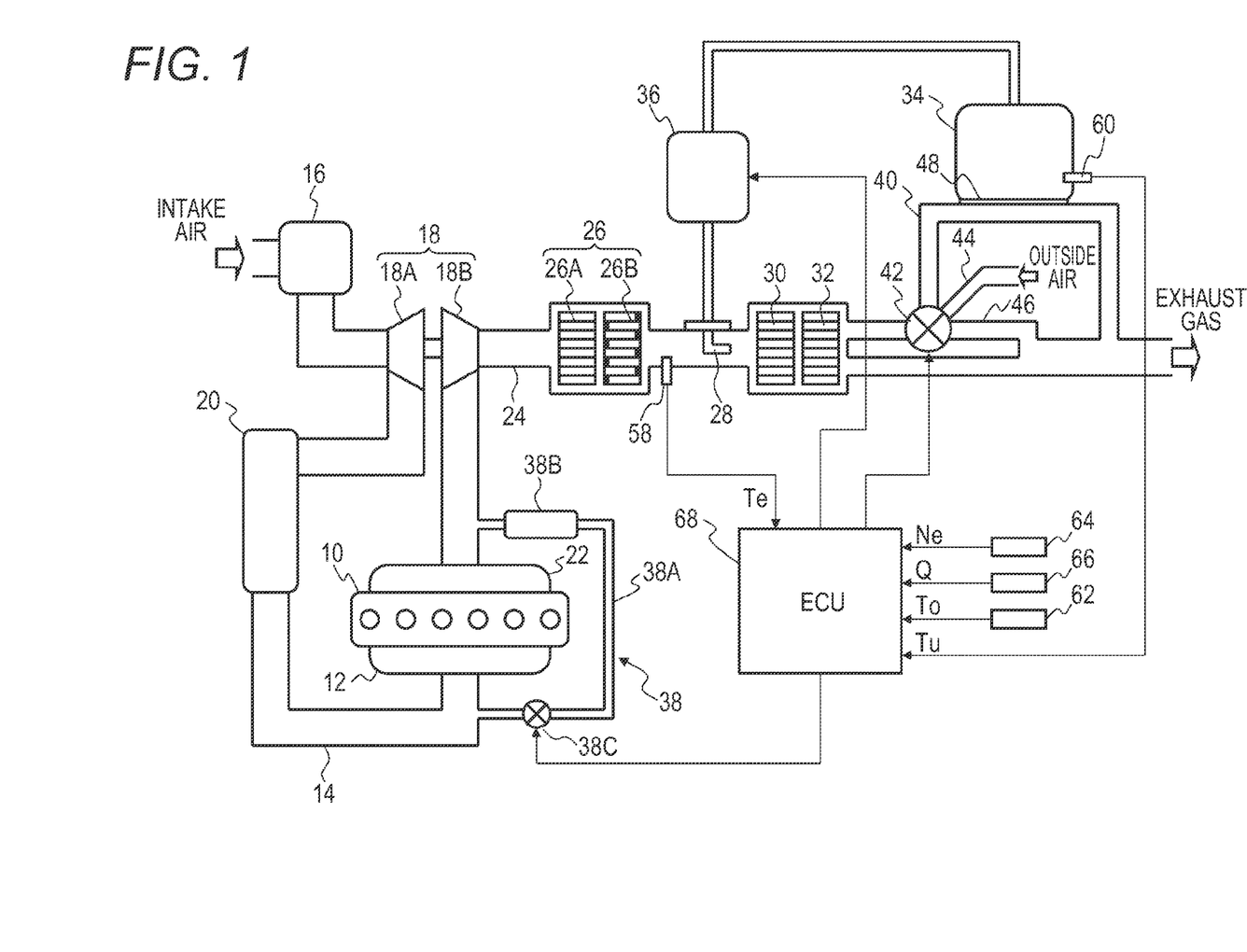
FIG. 1 is a diagram illustrating the entire configuration of an example of an exhaust gas purification apparatus.

FIG. 1 illustrates an example of an exhaust gas purification apparatus that purifies particulate matter (PMs) and NOx in exhaust gas.

In an intake pipe 14 connected to an intake manifold 12 of a diesel engine 10, an air cleaner 16 that filters dust, etc. present in intake air, a compressor 18A of a turbocharger 18 that supercharges intake air, and an intercooler 20 that cools intake air that has passed through the turbocharger 18 are disposed in this order in the direction of intake air circulation.

On the other hand, in an exhaust pipe 24 connected to an exhaust manifold 22 of the diesel engine 10, a turbine 18B of the turbocharger 18, a continuous regeneration type diesel particulate filter (DPF) device 26, an injection nozzle 28 that injects a urea aqueous solution, an SCR converter 30 that selectively reduces and purifies NOx by using ammonia produced by the hydrolysis of the urea aqueous solution, and an oxidation catalyst converter 32 that oxidizes ammonia that has passed through the SCR converter 30 are disposed in this order in the direction of exhaust gas circulation. The continuous regeneration type DPF device 26 includes: a diesel oxidation catalyst (DOC) converter 26A that oxidizes at least nitrogen monoxide (NO) into nitrogen dioxide ($NO_2$); and a DPF 26B that removes PMs present in exhaust gas. Instead of the DPF 26B, a catalyzed soot filter (CSF) that carries catalyst (an active component and an additive component) on the surface thereof may also be used. Here, the urea aqueous solution is an example of a precursor of the liquid reducing agent.

The urea aqueous solution stored in a tank 34 made of metal such as stainless steel is supplied to the injection nozzle 28 via a reducing agent adding unit 36 incorporating a pump and a flow rate control valve. Here, the reducing agent adding unit 36 may be divided into a pump module incorporating a pump, and a dosing module incorporating a flow rate control valve.

An exhaust gas recirculation (EGR) device 38 that introduces some of the exhaust gas into the intake air to recirculate the introduced exhaust gas, thereby reducing NOx by virtue of the decrease in combustion temperature, is attached to the diesel engine 10. The EGR device 38 includes: an EGR pipe 38A that introduces some of the exhaust gas flowing through the exhaust pipe 24 into the intake pipe 14; an EGR cooler 38B that cools exhaust gas flowing through the EGR pipe 38A; and an EGR control valve 38C that controls the EGR rate of exhaust gas introduced into the intake pipe 14.

The exhaust pipe 24 located on an exhaust gas downstream side of the oxidation catalyst converter 32 is provided with a bypass pipe 40 that allows some of the exhaust gas flowing through the exhaust pipe 24 to be diverted to the tank 34, to cause an exchange of heat between the diverted exhaust gas and the urea aqueous solution, stored in the tank 34. At a connection point of the exhaust pipe 24 and the bypass pipe 40, an outside-air mixer 42 that mixes outside air with the exhaust gas flowing through the bypass pipe 40 is disposed.

The outside-air mixer 42 increases or decreases the area of an opening (degree of opening) at the connecting a part of the outside-air introducing pipe 44 that introduces outside air, thereby controlling the proportion of the outside air mixed with the exhaust gas. When the urea aqueous solution stored in the tank 34 is not frozen, the outside-air mixer 42 does not have to divert the exhaust gas to the tank 34. Therefore, the outside-air mixer 42 has a function of preventing the exhaust gas from branching off to the bypass pipe 40 from the exhaust pipe 24. Because of this, an exhaust gas return pipe 46 that directly returns the exhaust gas to the exhaust pipe 24 without directing the exhaust gas that has passed through the oxidation catalyst converter 32 to the tank 34 is connected to the outside-air mixer 42.

Although in the foregoing, the point at which the bypass pipe 40 takes out some of the exhaust gas is on the exhaust gas downstream side of the oxidation catalyst converter 32, but the point is not limited thereto, and the point may be, for example, in the exhaust pipe 24 located between the continuous regeneration type DPF device 26 and the injection nozzle 28, or in the exhaust pipe 24 located between the SCR converter 30 and the oxidation catalyst converter 32. In these cases, the exhaust gas diverted to the tank 34 is returned to an appropriate point of the exhaust pipe 24 depending on the purified state of the exhaust gas.

Figure 2:
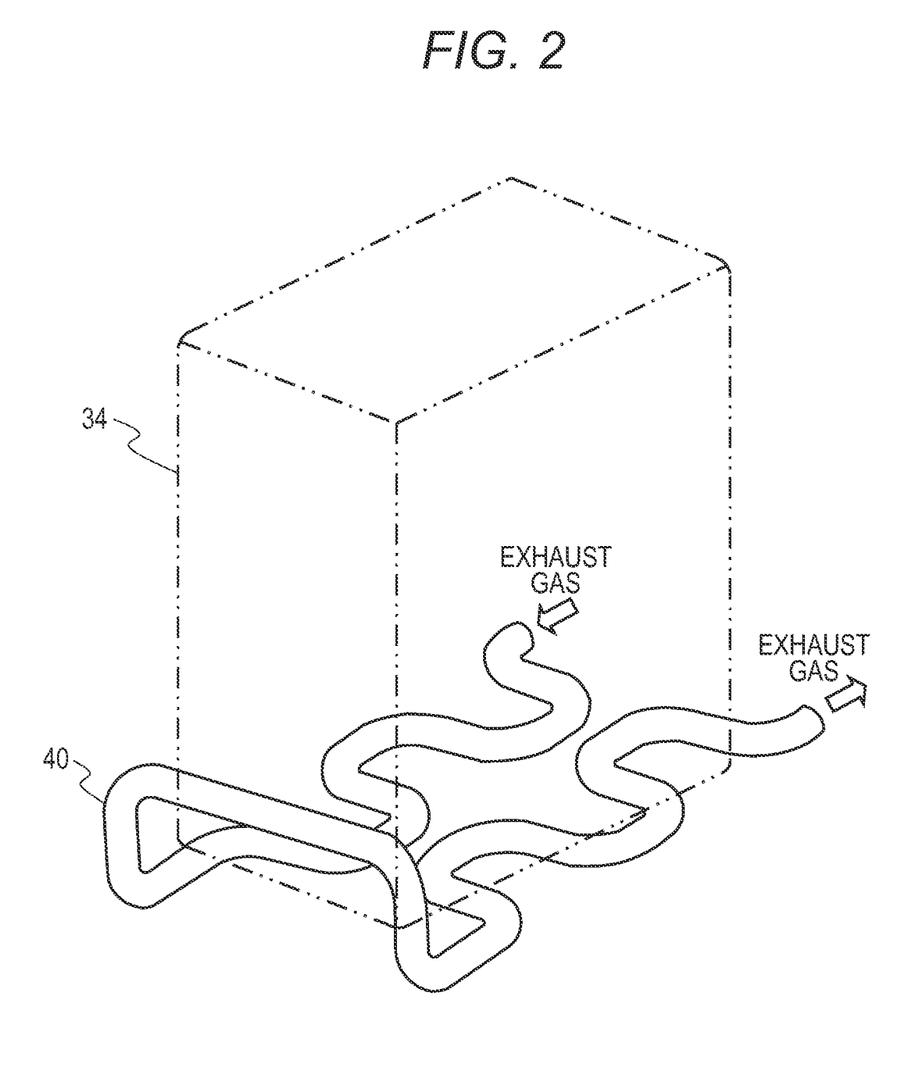
FIG. 2 is a perspective view illustrating an example of a bypass pipe.

The intermediate part of the bypass pipe 40 is in contact with at least a part of the outer peripheral surface of the tank 34 in order to cause the exchange of heat between the exhaust gas flowing through the bypass pipe 40 and the urea aqueous solution stored in the tank 34. In order to increase the area of contact with the tank 34, as illustrated in FIG. 2, the part of the bypass pipe 40, which is in contact with the tank 34, is formed to be bent multiple times. In this case, a metal sheet 48 for enhancing heat transfer between the tank 34 and bypass pipe 40 may be interposed therebetween. Furthermore, in order to make good heat transfer from the metal sheet 48 to the tank 34, a heat sink (not shown) may be formed in the metal sheet 48.

Figure 3:
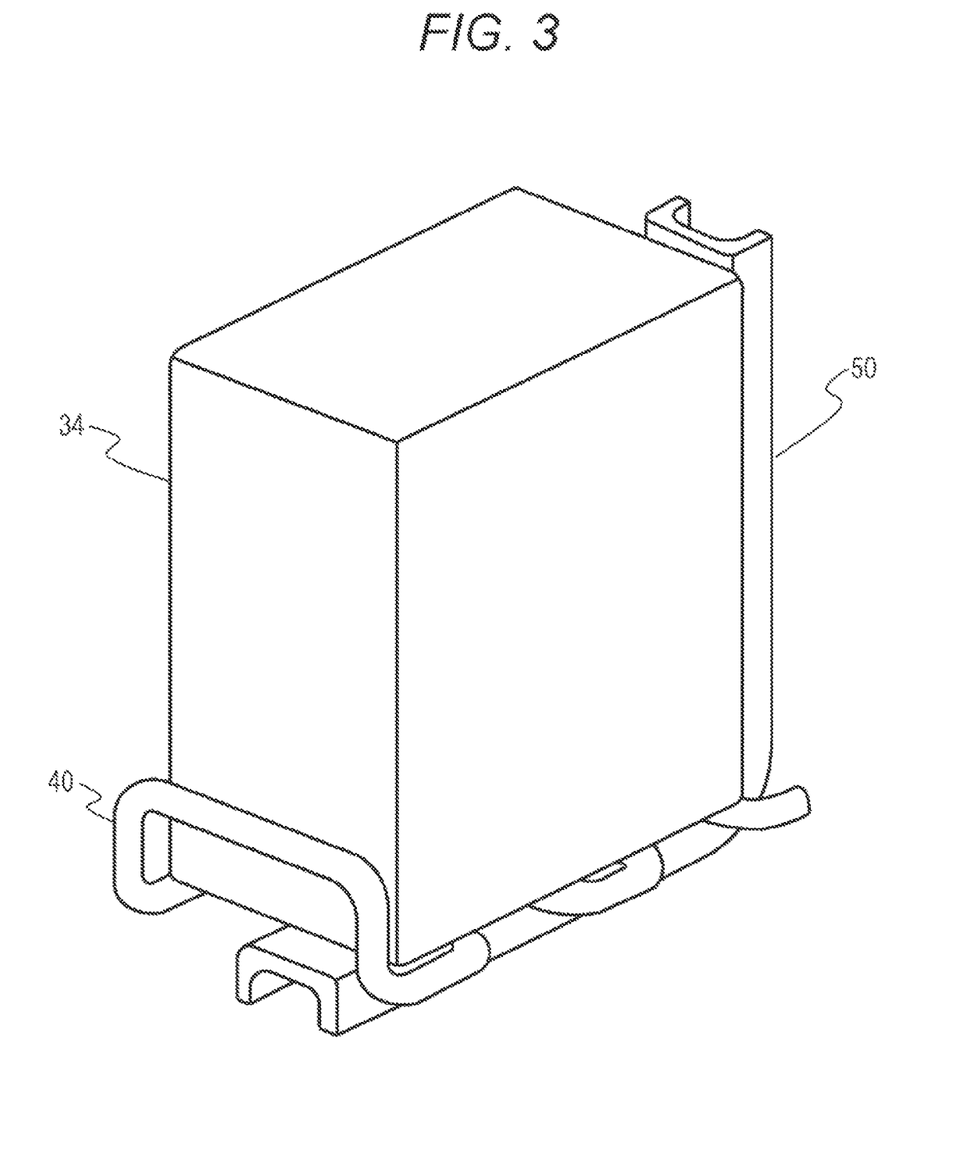
FIG. 3 is a perspective view of an example of a bypass pipe composing a part of a bracket.

Since the bypass pipe 40 has the strength to form a part of the exhaust system, the bypass pipe 40 can form at least a part of a bracket 50 for attaching the tank 34 to a vehicle body (not shown), as illustrated in FIG. 3. As a result, the bracket 50 for attaching the tank 34 to the vehicle can be simplified, thus enabling a reduction in weight.

Figure 4:
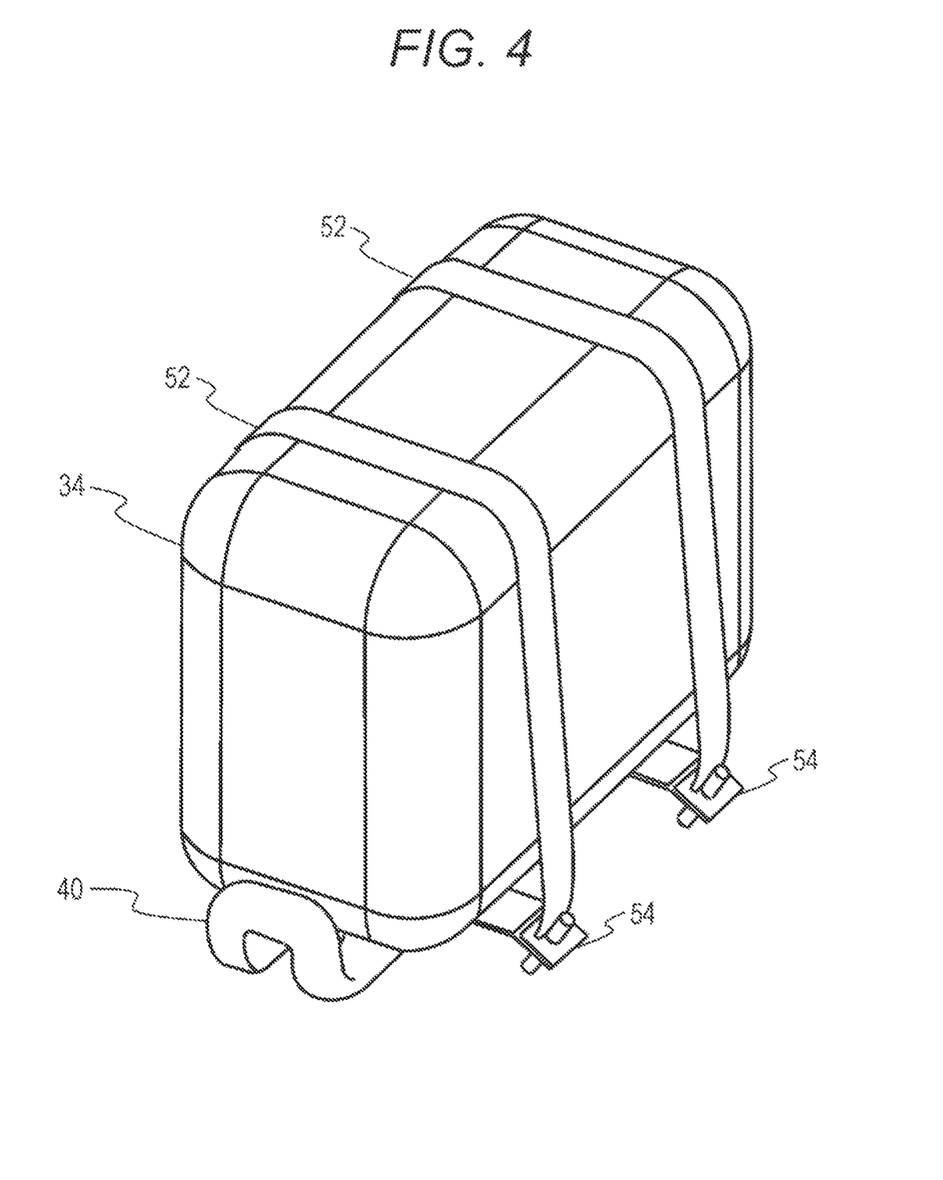
FIG. 4 is a perspective view of another example of a bypass pipe composing a part of a bracket.
Figure 5:
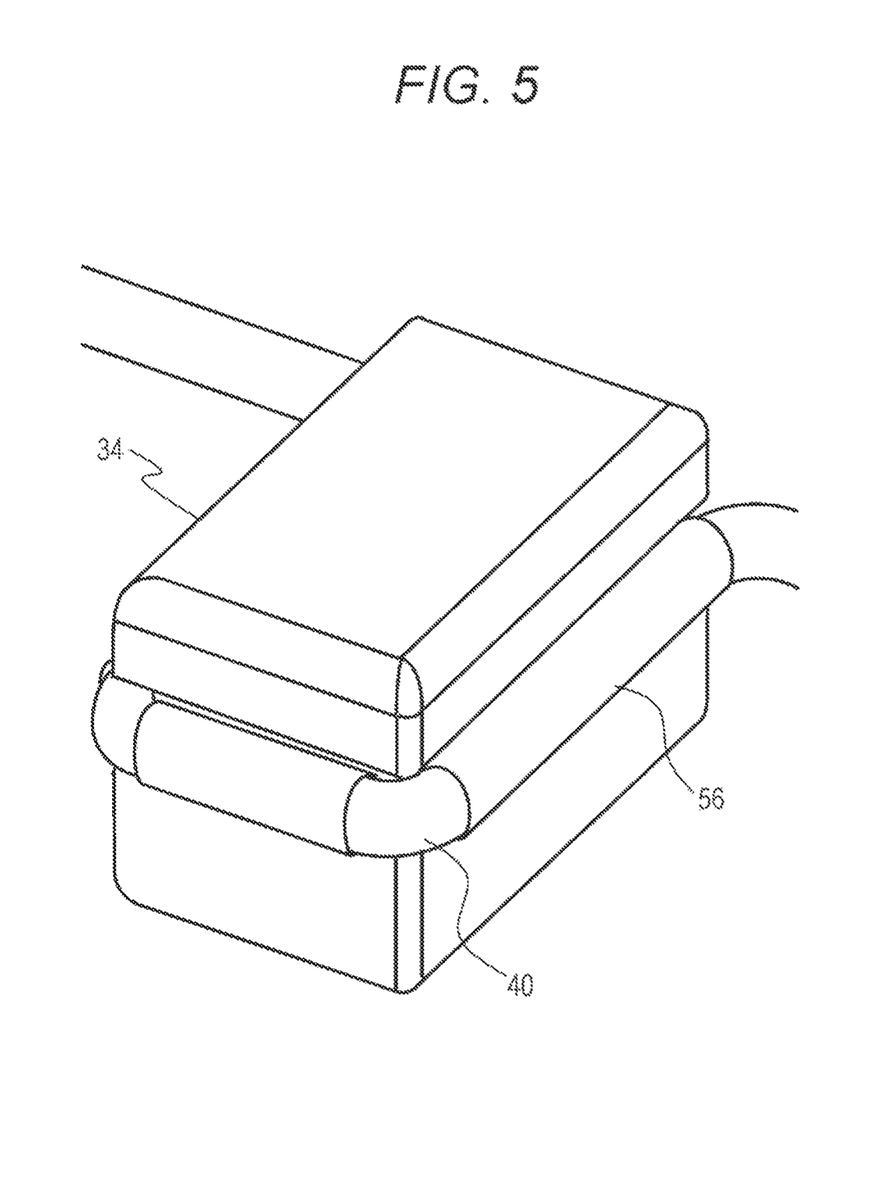
FIG. 5 is a perspective view of still another example of a bypass pipe composing a part of a bracket.

As a structure of the bracket for attaching the tank 34 to the vehicle body, mounting members 54 for detachably attaching straps 52 for fixing the tank 34 to the bypass pipe 40 may be directly fixed to the bypass pipe 40, as illustrated in FIG. 4, or the bypass pipe 40 may be fitted in a groove formed recessed in the periphery of the tank 34, as illustrated in FIG. 5. In the case of fitting the bypass pipe 40 in the groove of the tank 34, for example, an elastic member 56, formed of rubber having superior heat conductivity, may be wound around a predetermined part of the bypass pipe 40 in order to prevent direct contact of the tank 34 with the bypass pipe 40.

An exhaust gas temperature sensor 58, which measures the temperature of exhaust gas (exhaust gas temperature) Te, is attached to the exhaust pipe 24 located between the continuous regeneration type DPF device 26 and the injection nozzle 28. A reducing agent temperature sensor 60 that measures the temperature Tu of the urea aqueous solution stored in the tank 34 is attached to the tank 34. In additional, an outside-air temperature sensor 62 that measures the temperature of outside air (outside air temperature) To is attached to a predetermined portion of the vehicle. Furthermore, to predetermined portions of the diesel engine 10, a rotational speed sensor 64 that measures the rotational speed Ne thereof, and a load sensor 66 that measures the load Q thereof are attached. Here, as the load Q of the diesel engine 10, a torque, a fuel injection amount, a supercharging pressure, a degree of accelerator opening, a degree of throttle opening, or the like can be used. Instead of the configuration in which the outside air temperature To, the rotational speed Ne, and the load Q are directly read from each sensor, the outside air temperature To, the rotational speed Ne, and the load Q may be read from various control units, such as an engine control unit, which are connected via an on-board network such as a controller area network (CAN).

Respective output signals from the exhaust gas temperature sensor 58, the reducing agent temperature sensor 60, the outside-air temperature sensor 62, the rotational speed sensor 64, and the load sensor 66 are input to a control unit 68 with a built-in computer. The control unit 68 electronically controls the pump and the flow rate control valve of the reducing agent adding unit 36 according to the exhaust gas temperature Te, the rotational speed Ne, and the load Q by executing a control program stored in a nonvolatile memory such as a flash read only memory (ROM). Also, the control unit 68 electronically controls the outside-air mixer 42 according to the exhaust gas temperature Te, the reducing agent temperature Tu, and the outside air temperature To, by executing the control program. Here, the exhaust gas temperature Te, the rotational speed Ne, and the load Q are examples of an engine operation state.

In such an exhaust gas purification apparatus, exhaust gas from the diesel engine 10 is introduced into the DOC converter 26A of the continuous regeneration type DPF device 26 via the exhaust manifold 22 and the turbine 18B of the turbocharger 18. The exhaust gas introduced into the DOC converter 26A flows into the DPF 26B while NO is oxidized into $NO_2$. In the DPF 26B, PMs in the exhaust gas is removed and continuously oxidized (burned) using $NO_2$ produced in the DOC converter 26A.

The urea aqueous solution injected from the injection nozzle 28 according to the engine operation state is hydrolyzed using exhaust heat and water vapor in the exhaust gas and consequently converted into ammonia that functions as a reducing agent. It is known that this ammonia selectively undergoes a reduction reaction with NOx in exhaust gas in the SCR converter 30 and is purified into $H_2O$ (water) and $N_2$ (nitrogen) that are harmless. At this time, NO is oxidized into $NO_2$ by the DOC converter 26A and the ratio of NO to $NO_2$ in exhaust gas approaches the ratio appropriate for the selective reduction reaction and, accordingly, a NOx purification rate in the SCR converter 30 can be improved. On the other hand, ammonia that has passed through the SCR converter 30 is oxidized by the oxidation catalyst converter 32, disposed on the exhaust gas downstream side of the SCR converter 30. Thus, the ammonia can be prevented from being emitted into the atmosphere as it is.

Figure 6:
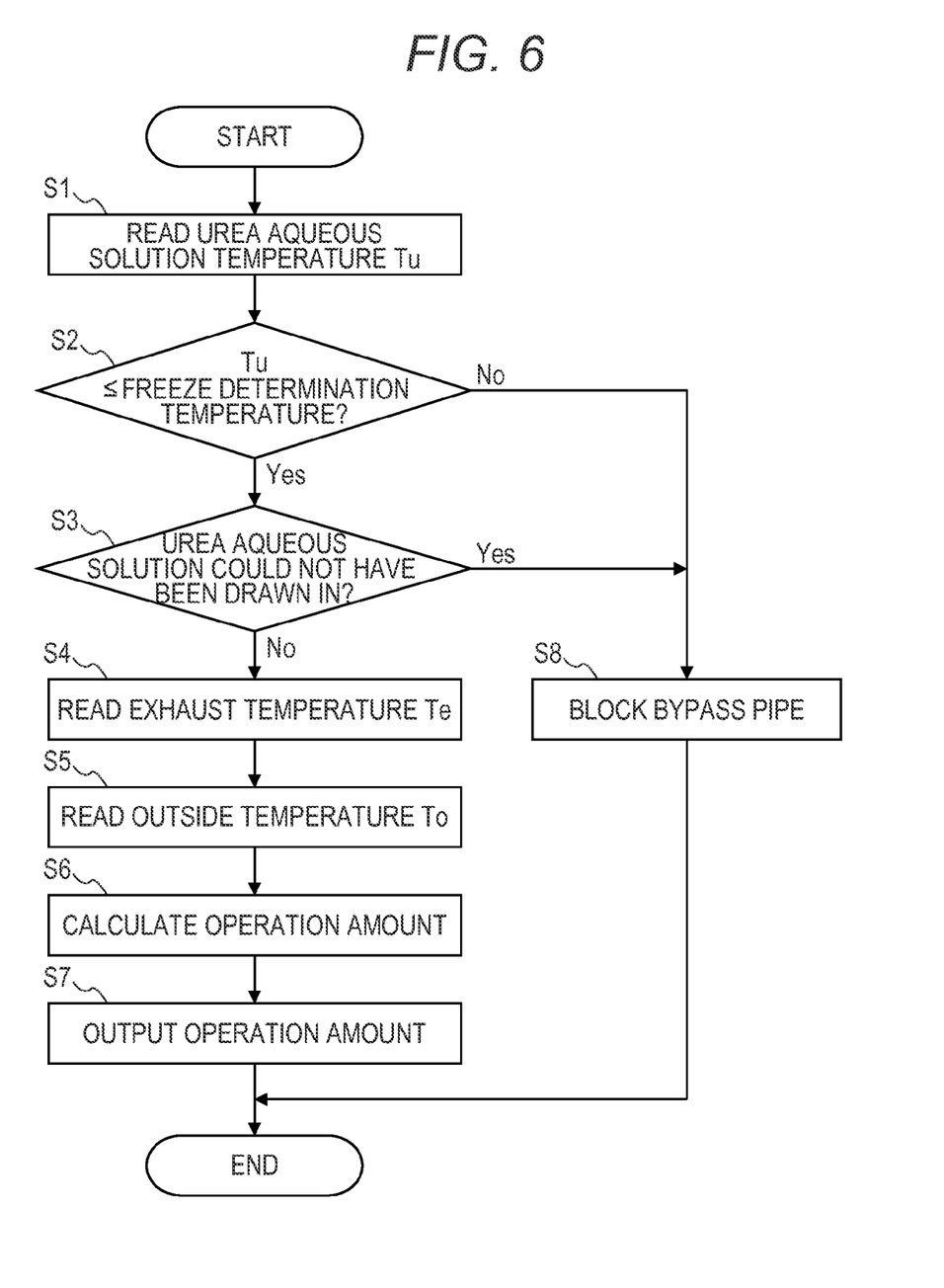
FIG. 6 is a flowchart illustrating an example of a control program.

FIG. 6 illustrates an example of a control program in which the control unit 68 repeats every predetermined time as a result of starting the diesel engine 10.

In step 1 (in the drawing, abbreviated to "S1", and the same applies hereinafter), the control unit 68 reads the temperature Tu of the urea aqueous solution from the reducing agent temperature sensor 60.

In step 2, the control unit 68 determines whether or not the temperature Tu of the urea aqueous solution is equal to or below a freeze determination temperature. Here, the freeze determination temperature is a threshold value for determining whether or not there is a possibility that the urea aqueous solution stored in the tank 34 is frozen. For example, this temperature is set to a temperature slightly higher than a freezing point of −11° C. used in the case in which its concentration is 32.5%. If the temperature Tu of the urea aqueous solution is equal to or below the freeze determination temperature, the control unit 68 causes processing to proceed to step 3 (Yes). If the temperature Tu of the urea aqueous solution is higher than the freeze determination temperature, the control unit 68 causes the processing to proceed to step 8 (No).

In step 3, the control unit 68 determines whether or not the urea aqueous solution in the tank 34 could have been drawn in the reducing agent adding unit 36. Here, the determination whether or not the urea aqueous solution could have been drawn in can be made from, for example, the discharge pressure of the pump incorporated in the reducing agent adding unit 36. If the urea aqueous solution could not have been drawn in, the control unit 68 causes processing to proceed to step 4 (Yes). If the urea aqueous solution could have been drawn in, the control unit 68 causes processing to proceed to step 8 (No).

In step 4, the control unit 68 reads an exhaust gas temperature Te from the exhaust gas temperature sensor 58.

In step 5, the control unit 68 reads an outside air temperature To from the outside-air temperature sensor 62.

In step 6, referring to a map that defines an operation amount in relation to the exhaust gas temperature and the outside air temperature, the control unit 68 calculates an operation amount for the outside-air mixer 42, corresponding to the exhaust gas temperature Te and the outside air temperature To. The operation amount for the outside-air mixer 42 is an operation amount that is required to reduce temperature of the exhaust gas, by which the urea aqueous solution stored in the tank 34 is heated, to a predetermined temperature or below. As such an operation amount, for example, a duty ratio or the like corresponding to the degree of opening can be used. As the predetermined temperature, a temperature at which ammonia-based gas is not generated even when the urea aqueous solution is heated, for example, about 60° C., can be used.

In step 7, the control unit 68 outputs to the outside-air mixer 42 a signal corresponding to the operation amount.

In step 8, since the control unit 68 determined that the urea aqueous solution stored in the tank 34 is not frozen, the control unit 68 outputs a passage blocking signal for the bypass pipe 40, to the outside-air mixer 42, in order to prevent exhaust gas from branching off to the bypass pipe 40 from the exhaust pipe 24. Here, when the outside-air mixer 42 blocks the passage of the bypass pipe 40, exhaust gas supplied from the oxidation catalyst converter 32 to the outside-air mixer 42 is returned to the exhaust pipe 24 through the exhaust gas return pipe 46.

Next, a process for thawing a urea aqueous solution, which is realized by such a control program, will be described.

Some of the exhaust gas passed through the oxidation catalyst converter 32 is supplied to the outside-air mixer 42. If the temperature Tu of the urea aqueous solution stored in the tank 34 is higher than the freeze determination temperature, or if the urea aqueous solution could have been drawn in, it is determined that the urea aqueous solution in the tank 34 is not frozen or is thawed. As a result, the exhaust gas supplied to the outside-air mixer 42 is returned to the exhaust passage 24 through the exhaust gas return pipe 46. Accordingly, when the urea aqueous solution in the tank 34 is not frozen, the urea aqueous solution does not have to be heated more than is necessary, so that the production of components derived from urea can be prevented, for example.

On the other hand, if the temperature Tu of the urea aqueous solution stored in the tank 34 is equal to or below the freeze determination temperature and if the urea aqueous solution could not have been drawn in, it is determined that the aqueous solution in the tank 34 is frozen. As a result, the outside-air mixer 42 is controlled using the operation amount corresponding to the exhaust gas temperature Te and the outside air temperature To. At this time, if the temperature Tu of the urea aqueous solution is equal to or below the freeze determination temperature and, in addition, the urea aqueous solution could not have been drawn in, it is determined that the urea aqueous solution stored in the tank 34 is frozen, thus making it possible to improve freeze determination accuracy. As a result, when the urea aqueous solution in the tank 34 is frozen, the exhaust gas cooled down to a predetermined temperature or below is supplied to the tank 34. Then, the exchange of heat between the exhaust gas flowing through the bypass pipe 40 and the urea aqueous solution in the tank 34 is caused to occur, so as to thaw the urea aqueous solution. Since the tank 34 is made of metal, the urea aqueous solution is heated from the bottom wall and peripheral walls thereof at this time. Furthermore, because the exhaust gas used for thawing the urea aqueous solution has a high temperature even right after cold start or the like, this exhaust gas is cooled with outside air to make the temperature of the exhaust gas appropriate.

Therefore, unlike engine coolant, the thawing of the urea aqueous solution frozen in the tank 34 can be started even right after cold start or in low load running and, accordingly, a time required to thaw the urea aqueous solution can be shortened. Furthermore, since the exhaust gas for thawing the urea aqueous solution is mixed with outside air to have the temperature thereof be appropriate, the tank 34 can be mounted away from the diesel engine 10. Furthermore, since the pipes for thawing are not disposed in the tank 34, the capacity of the tank 34 is not reduced.

Figure 7:
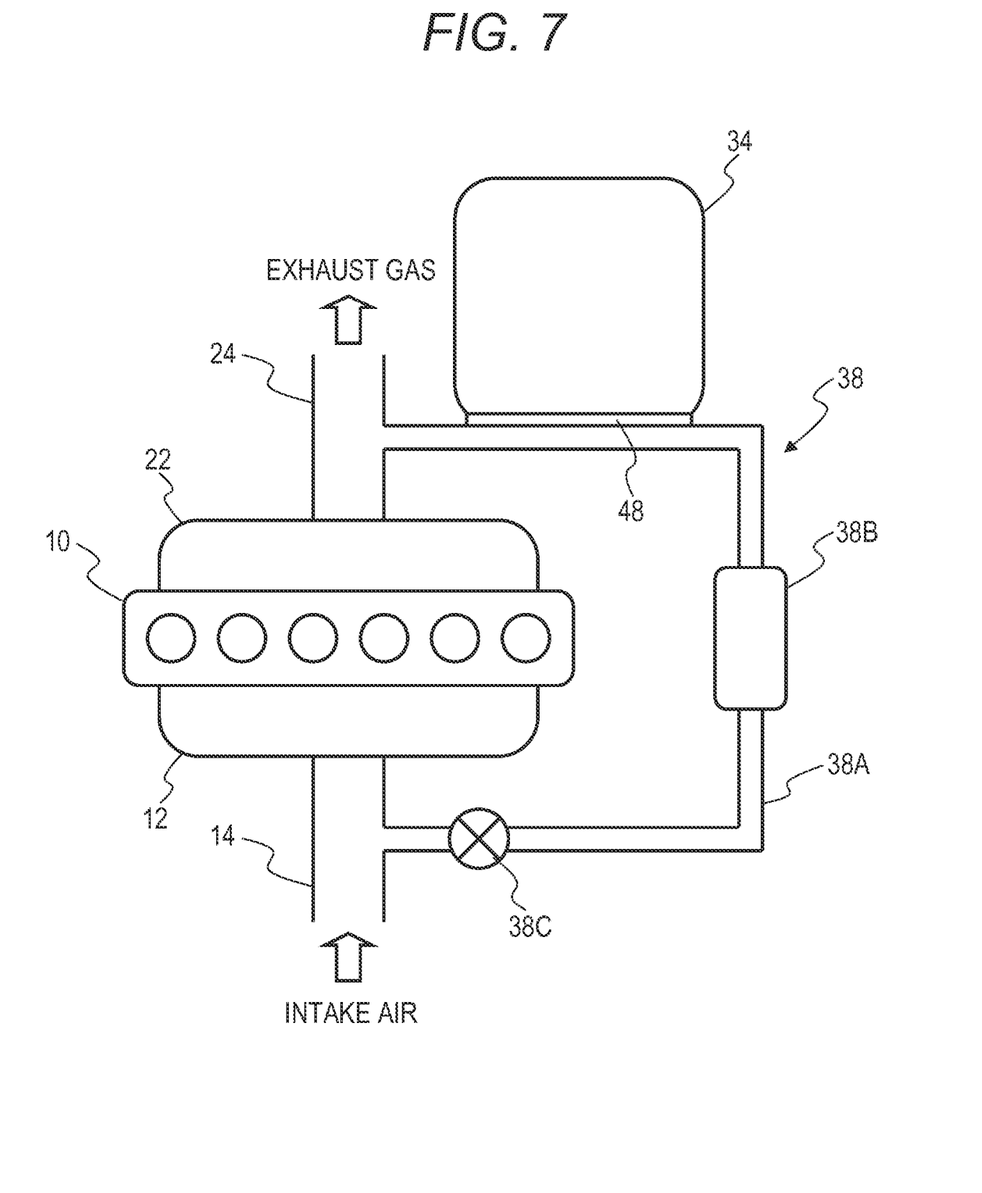
FIG. 7 is a diagram of a partial configuration of another example of an exhaust gas purification apparatus.

The exhaust gas for heating the urea aqueous solution stored in the tank 34 is not limited to the exhaust gas flowing through the exhaust pipe 24, but may be exhaust gas flowing through the EGR pipe 38A of the EGR device 38, as illustrated in FIG. 7. Furthermore, a substance to be thawed is not limited to the urea aqueous solution stored in the tank 34, but may be various liquid reducing agents or precursors thereof, which can be used in the exhaust gas purification apparatus that selectively reduces and purifies NOx. Furthermore, whether or not the urea aqueous solution stored in the tank 34 is frozen may be determined from either one of the above two conditions; that is, it may be determined based on whether or not the temperature Tu of the urea aqueous solution is equal to or below the freeze determination temperature, or alternatively, based on whether or not the urea aqueous solution could not have been drawn in.

It should also be understood that many modifications and variations of the described embodiments of the invention will be apparent to a person having an ordinary skill in the art without departing from the spirit and scope of the present invention as claimed in the appended claims. Furthermore, the foregoing description of the embodiment according to the present invention is provided for illustration only, and it is not for the purpose of limiting the invention, the invention as claimed in the appended claims and their equivalents.

What is claimed is:

1. An exhaust gas purification apparatus comprising:
   a reduction catalyst converter configured to reduce and purify nitrogen oxides in exhaust gas;
   a tank configured to store a liquid reducing agent or precursor thereof;
   an injection nozzle configured to inject the liquid reducing agent or precursor thereof stored in the tank on an exhaust gas upstream side of the reduction catalyst converter;
   a bypass pipe configured to allow some of the exhaust gas flowing through an exhaust pipe to be diverted to the tank, to cause an exchange of heat between the diverted exhaust gas and the liquid reducing agent or precursor thereof stored in the tank; and
   an outside-air mixer configured to mix outside air with the exhaust gas flowing through the bypass pipe to reduce a temperature of the exhaust gas.

2. The exhaust gas purification apparatus according to claim 1, wherein the bypass pipe forms at least a part of a bracket for attaching the tank to a vehicle body.

3. The exhaust gas purification apparatus according to claim 1, further comprising:
   an exhaust gas temperature sensor configured to measure an exhaust gas temperature;
   an outside-air temperature sensor configured to measure an outside air temperature; and
   a control unit configured to control the outside-air based on the exhaust gas temperature measured by the exhaust gas temperature sensor and the outside air temperature measured by the outside-air temperature sensor.

4. The exhaust gas purification apparatus according to claim 3, further comprising:
   a reducing agent temperature sensor configured to measure a temperature of the liquid reducing agent or precursor thereof stored in the tank,
   wherein the outside-air mixer has a function of preventing the exhaust gas from branching off to the bypass pipe from the exhaust pipe, and
   wherein based on the temperature of the liquid reducing agent or precursor thereof measured by the reducing agent temperature sensor, the control unit is configured to determine whether or not the liquid reducing agent or precursor thereof stored in the tank is frozen, and if the control unit determines that the liquid reducing agent or precursor thereof is not frozen, the control unit is configured to control the outside-air mixer so as to prevent the exhaust gas from branching off to the bypass pipe from the exhaust pipe.

5. The exhaust gas purification apparatus according to claim 1, wherein a metal sheet is interposed between the bypass pipe and the tank.

6. The exhaust gas purification apparatus according to claim 5, wherein a heat sink is attached to the metal sheet.

7. The exhaust gas purification apparatus according to claim 1, wherein an oxidation catalyst converter configured to oxidize the liquid reducing agent or precursor thereof, that has passed through the reduction catalyst converter, is further disposed on an exhaust gas downstream side of the reduction catalyst converter.

8. The exhaust gas purification apparatus according to claim 1, wherein a diesel particulate filter configured to remove particulate matter in the exhaust gas is further disposed on the exhaust gas upstream side of the reduction catalyst converter.

9. The exhaust gas purification apparatus according to claim 1, wherein the liquid reducing agent or precursor thereof is a urea aqueous solution.

10. A method for thawing a liquid reducing agent or precursor thereof, comprising the step of heating a tank storing a liquid reducing agent or precursor thereof to be injected on an exhaust gas upstream side of a reduction catalyst converter that reduces and purifies nitrogen oxides in exhaust gas, with some of the exhaust gas flowing through an exhaust pipe diverted to the tank through a bypass pipe, so that the liquid reducing agent or precursor thereof frozen in the tank is thawed, wherein an outside air is mixed with the exhaust gas flowing through the bypass pipe to reduce a temperature of the exhaust gas.

11. The method for thawing the liquid reducing agent or precursor thereof according to claim 10, wherein the bypass pipe forms at least a part of a bracket for attaching the tank to a vehicle body.

* * * * *